(No Model.)

H. E. SMITH.
IRONING MACHINE.

No. 345,996. Patented July 20, 1886.

WITNESSES:
Otto Hufeland
William Miller

INVENTOR
Hamilton E. Smith
BY
Van Santvoord & Hauff
his ATTORNEYS

UNITED STATES PATENT OFFICE.

HAMILTON E. SMITH, OF NEW YORK, N. Y.

IRONING-MACHINE.

SPECIFICATION forming part of Letters Patent No. 345,996, dated July 20, 1886.

Application filed August 6, 1885. Serial No. 173,708. (No model.)

*To all whom it may concern:*

Be it known that I, HAMILTON E. SMITH, a citizen of the United States, residing at New York, in the county and State of New York, have invented new and useful Improvements in Means for Adjusting the Endless Aprons of Ironing-Machines, of which the following is a specification.

My invention relates to machines employing endless aprons—such, for example, as ironing-machines or mangles; and it consists in attaching to the ends of a rising-and-falling guide-roller, under which the apron passes, connecting-rods by which the operator can readily even the apron, and prevent it from running to one side, through levers, which are so arranged as to enable the operator to raise or lower one end of the roller independent of the other end, or both ends simultaneously, to lift the roller free from the apron.

Figure 1:
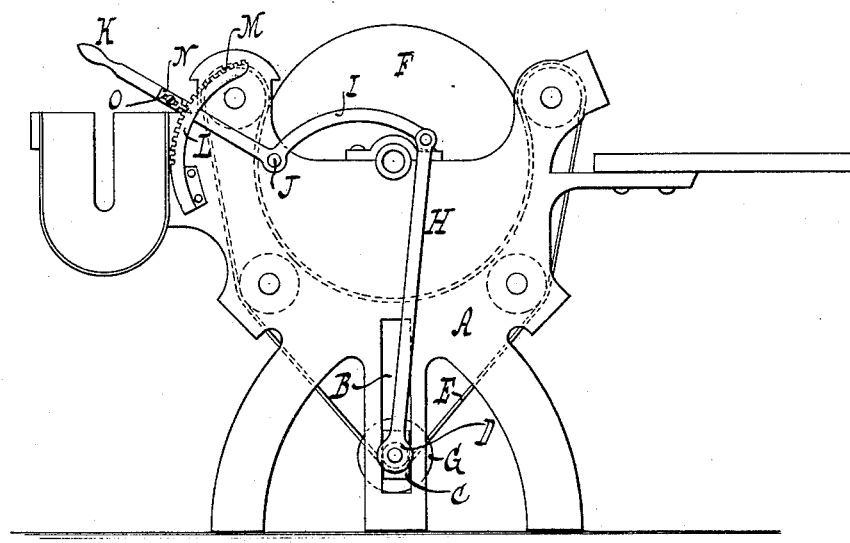
Figure 2:
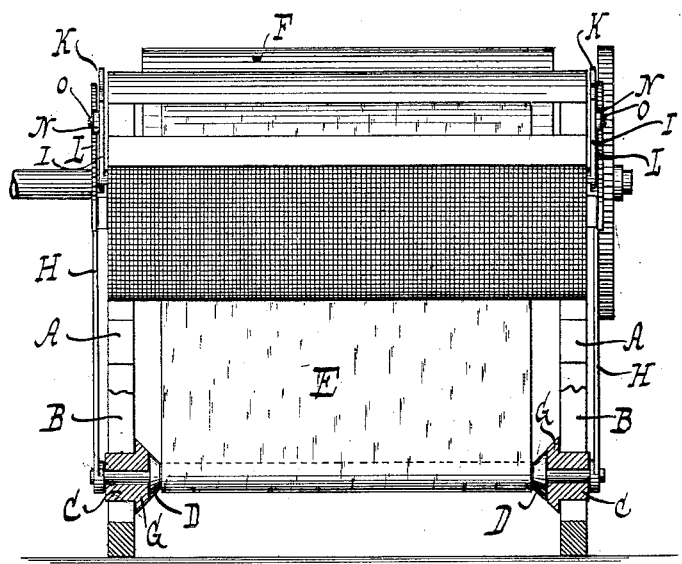

My improvement is illustrated in the accompanying drawings, in which Figure 1 is an end view of an ironing-machine to which my invention is applied. Fig. 2 is a front elevation showing parts of the machine broken away.

Similar letters indicate corresponding parts.

The letter A designates the frame of the machine, which is provided with vertical slots B, in which are placed the journal-boxes C, that form the bearings for the ends of the rising-and-falling roller D. Under the roller D is passed the apron E, which extends thence over guide-rollers, which take it to the cylinder F, under which it passes, as shown in the drawings. The inner ends of the journal-boxes are provided with conical surfaces G, which tend to prevent the apron from running to one side or the other, and to restore it to its true path whenever its edges may have swerved therefrom.

In order to provide additional means for keeping the apron in its true path, I secure upon the ends of the roller D connecting-rods H H, whose ends are provided with holes, in which the ends of the journal are free to turn. The connecting-rods H H are secured at their upper ends to the outer ends of levers I I, which turn on pivots J, secured to the frame of the machine. The ends of the levers to the left of the pivots form handles K K, by which the levers are operated. These handles pass behind curved racks L L, which are supported on the frame, and which have teeth M on their convex sides, that are engaged by a dog, N, which is provided on the outer part of the handle, and which is so arranged that when a lever has been operated to raise or lower one end of the roller D the adjustment is secured by sliding the dog N into engagement with the teeth of the rack, as is shown in the drawings, and the dog is then locked by the set-screw O. The dog is so arranged on the side of the handle of the lever as to project therefrom sufficiently to bring it in the plane of the rack. When the dog is drawn back, the lever is free to be moved to new positions.

My improvement enables me to make compensation for unequal wear of the guide-rollers and of the cylinder, and for any unequal stretching or shrinking of the apron, by raising or lowering one or the other end of the bottom guide-roller, as occasion requires, and also enables me to raise the roller free from the apron when desired. For convenience, the teeth of the rack may have numbers marked on them, thereby enabling the operator to know when the lower guide-roller, D, is parallel to the cylinder F. My improvement is shown as applied at each end of the roller D.

What I claim as new, and desire to secure by Letters Patent, is—

1. The combination, with the main frame, the cylinder, the vertically-movable guide-roller located beneath the cylinder, and the apron passing under the cylinder and said guide-roller, of mechanism for raising and lowering either end of the guide-roller independent of the other end, or both ends simultaneously, consisting of a pair of vertically-movable rods connected with and supporting the ends of the guide-rollers, and pivoted levers having a pivotal connection at one end with the rods, substantially as described.

2. The combination, in an ironing-machine, of the main frame, the cylinder, the vertically-movable guide-roller located beneath the cylinder, the apron passing under the cylinder, and the said guide-roller and boxes, in which the latter is journaled, with a pair of vertically-movable rods having their lower ends connected with and supporting the ends of the guide-roller, the pair of levers pivoted to the frame and having pivotal connections with the upper ends of the rods, the racks on the frame, and dogs on the levers for locking the levers in their adjusted position, said rods and levers serving to raise or lower either or both ends of the guide-roller, substantially as and for the purpose described.

In testimony whereof I have hereunto set my hand and seal in the presence of two subscribing witnesses.

HAMILTON E. SMITH. [L. S.]

Witnesses:
E. F. KASTENHUBER,
A. FABER DU FAUR, Jr.